United States Patent
Dalphond et al.

(10) Patent No.: US 7,019,096 B2
(45) Date of Patent: Mar. 28, 2006

(54) SYNTHETIC RUBBER THAT EXHIBITS LOW HYSTERESIS

(75) Inventors: Jake Alexandre Dalphond, Copley, OH (US); Steven Kristofer Henning, Hudson, OH (US); Stephan Rodewald, Canal Fulton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/778,264

(22) Filed: Feb. 13, 2004

(65) Prior Publication Data

US 2005/0182221 A1 Aug. 18, 2005

(51) Int. Cl.
*C08F 236/10* (2006.01)

(52) U.S. Cl. .............. 526/338; 526/288; 526/293; 525/332.6; 524/547; 524/551; 152/450

(58) Field of Classification Search ............... 526/338, 526/293, 288; 524/547, 551; 525/332.6; 152/450
See application file for complete search history.

(56) References Cited

U.S. PATENT DOCUMENTS

| | | | | |
|---|---|---|---|---|
| 3,435,011 A | * | 3/1969 | Uraneck et al. | 525/271 |
| 3,879,328 A | * | 4/1975 | Jones | 524/389 |
| 4,052,542 A | * | 10/1977 | Wei et al. | 525/359.4 |
| 4,268,642 A | * | 5/1981 | Gunesin et al. | 525/382 |
| 4,423,198 A | * | 12/1983 | Tsai | 526/263 |

OTHER PUBLICATIONS

Rubber Technology, 3rd ed., M. Morton (ed.), Van Nostrand Reinhold, NY, 1987, pp. 86-88, 94-98, 209 and 228-230.*

* cited by examiner

*Primary Examiner*—Fred Teskin
(74) *Attorney, Agent, or Firm*—Alvin T. Rockhill

(57) ABSTRACT

This invention discloses a rubbery polymer which is comprised of repeat units that are derived from (1) at least one conjugated diolefin monomer, and (2) at least one leaving group-bearing monomer having the structural formula:

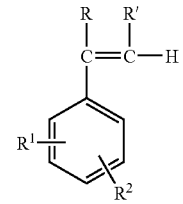

wherein R represents an alkyl group containing from 1 to about 10 carbon atoms or a hydrogen atom, wherein R' represents a methyl group or a hydrogen atom, with the proviso that if R represents an alkyl group then R' represents a hydrogen atom, and wherein $R^1$ and $R^2$ can be the same or different, wherein $R^1$ represents an alkyl group that is functionalized with a leaving group, wherein $R^2$ represents a moiety selected from the group consisting of hydrogen atoms, alkyl groups containing from 1 to 18 carbon atoms, aryl groups containing from 6 to 18 carbon atoms, alkaryl groups containing from 7 to 18 carbon atoms, and alkyl groups that are functionalized with a leaving group.

21 Claims, No Drawings

SYNTHETIC RUBBER THAT EXHIBITS LOW HYSTERESIS

BACKGROUND OF THE INVENTION

It is important for rubbery polymers that are used in tires, hoses, power transmission belts and other industrial products to have good compatibility with fillers, such as carbon black and silica. To attain improved interaction with fillers such rubbery polymers can be functionalized with various compounds, such as amines. U.S. Pat. No. 4,935,471 discloses a process for preparing a polydiene having a high level of affinity for carbon black which comprises reacting a metal terminated polydiene with a capping agent selected from the group consisting of (a) halogenated nitriles having the structural formula X—A—C≡N, wherein X represents a halogen atom and wherein A represents an alkylene group containing from 1 to 20 carbon atoms, (b) heterocyclic aromatic nitrogen containing compounds, and (c) alkyl benzoates. The capping agents disclosed by U.S. Pat. No. 4,935,471 react with metal terminated polydienes and replace the metal with a terminal cyanide group, a heterocyclic aromatic nitrogen containing group or a terminal group which is derived from an alkyl benzoate. For example, if the metal terminated polydiene is capped with a nitrile, it will result in the polydiene chains being terminated with cyanide groups. The use of heterocyclic aromatic nitrogen containing compounds as capping agents can result in the polydiene chains being terminated with a pyrrolyl group, an imidazolyl group, a pyrazolyl group, a pyridyl group, a pyrazinyl group, a pyrimidinyl group, a pyridazinyl group, an indolizinyl group, an isoindolyl group, a 3-H-indolyl group, a cinnolinyl group, a pteridinyl group, a β-carbolinyl group, a perimidinyl group, a phenanthrolinyl group or the like.

U.S. Pat. No. 4,935,471 also discloses that lithium amides are highly preferred initiators because they can be used to prepare polydienes which are terminated with polar groups at both ends of their polymer chains. The extra polar functionality provided by lithium amides results in increased interaction with carbon black resulting in better polymer-carbon black dispersion. The lithium amides disclosed by U.S. Pat. No. 4,935,471 include lithium pyrrolidide. U.S. Pat. No. 4,935,471 also indicates that preferred initiators include amino alkyl lithium compounds of the structural formula:

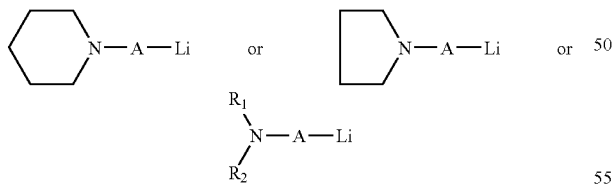

wherein A represents an alkylene group containing from 1 to 20 carbon atoms, and wherein $R_1$ and $R_2$ can be the same or different and represent alkyl groups containing from 1 to 20 carbon atoms.

It is also desirable for synthetic rubbers to exhibit low levels of hysteresis. This is particularly important in the case of rubbers that are used in tire tread compounds. Such polymers are normally compounded with sulfur, carbon black, accelerators, antidegradants and other desired rubber chemicals and are then subsequently vulcanized or cured into the form of a useful article. It has been established that the physical properties of such cured rubbers depend upon the degree to which the carbon black is homogeneously dispersed throughout the polydiene rubber. This is in turn related to the level of affinity that carbon black has for the rubber. This can be of practical importance in improving the physical characteristics of rubber articles that are made utilizing polydiene rubbers. For example, the rolling resistance and tread wear characteristics of tires can be improved by increasing the affinity of carbon black to the rubbery polymers utilized therein. Therefore, it would be highly desirable to improve the affinity of a given polydiene rubber for carbon black and/or silica. This is because a better dispersion of carbon black throughout polydiene rubbers which are utilized in compounding tire tread compositions results in a lower hysteresis value and consequently tires made therefrom have lower rolling resistance. It is also known that a major source of hysteresis is due to polymer chain ends that are not capable of full elastic recovery. Accordingly, improving the affinity of the rubber chain ends to the filler is extremely important in reducing hysteresis.

U.S. Pat. No. 6,080,835 discloses a functionalized elastomer comprising: a functional group defined by the formula:

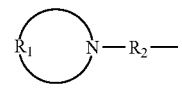

where $R_1$ is a selected from the group consisting of a divalent alkylene group, an oxy-alkylene group, an amino alkylene group, and a substituted alkylene group, each group having from about 6 to about 20 carbon atoms, $R_2$ is covalently bonded to the elastomer and is selected from the group consisting of a linear-alkylene group, a branched-alkylene group, and a cyclo-alkylene group, each group having from about 2 to about 20 carbon atoms.

U.S. Pat. No. 5,932,662 discloses a method of preparing a polymer comprising: preparing a solution of one or more anionically polymerizable monomers in a solvent; and, polymerizing under effective conditions, said monomers in the presence of a polymerization initiator having the formula

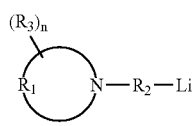

wherein $R_1$ is a divalent alkylene, an oxy- or amino-alkylene having from 6 to about 20 carbon atoms; and, $R_2$ is a linear-alkylene, branched-alkylene, or cyclo-alkylene having from about 2 to about 20 carbon atoms, Li is a lithium atom bonded directly to a carbon atom of $R_2$; and $R_3$ is a tertiary amino, an alkyl having from about 1 to about 12 carbon atoms; an aryl having from about 6 to about 20 carbon atoms; an alkaryl having from about 7 to about 20 carbon atoms; an alkenyl having from about 2 to about 12 carbon atoms; a cycloalkyl having from about 5 to about 20 carbon atoms; a cycloalkenyl having from about 5 to about 20 carbon atoms; a bicycloalkyl having from about 6 to about 20 carbon atoms; and, a bicycloalkenyl having from about 6 to about 20 carbon atoms; where n is an integer of from 0 to about 10.

U.S. Pat. No. 6,084,025 discloses a functionalized polymer prepared by a process comprising the steps of: preparing a solution of a cyclic amine compound, an organolithium compound, and from 3 to about 300 equivalents, based upon one equivalent of lithium, of a monomer selected from vinyl aromatic monomers, and mixtures thereof, where said cyclic amine compound is defined by the formula

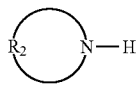

where $R_2$ is selected from the group consisting of an alkylene, substituted alkylene, bicycloalkane, and oxy- or N-alkylamino-alkylene group having from about 3 to about 16 methylene groups, N is a nitrogen atom, and H is a hydrogen atom, thereby forming a polymerization initiator having the formula $A(SOL)_y Li$, where Li is a lithium atom, SOL is a divalent hydrocarbon group having from 3 to about 300 polymerized monomeric units, y is from 0.5 to about 3, and A is a cyclic amine radical derived from said cyclic amine; charging the solution containing $A(SOL)_y Li$ with from about 0.01 to about 2 equivalents per equivalent of lithium of a chelating reagent, and an organic alkali metal compound selected from compounds having the formula $R_4 OM$, $R_5 C(O)OM$, $R_6 R_7 NM$, and $R_8 SO_3 M$, where $R_4$, $R_5$, $R_6$, $R_7$, and $R_8$ are each selected from alkyls, cycloalkyls, alkenyls, aryls, or phenyls, having from 1 to about 12 carbon atoms; and where M is Na, K, Rb or Cs, and sufficient monomer to form a living polymeric structure; and quenching the living polymeric structure.

U.S. Pat. No. 6,344,538 discloses functionalized monomers and polymerized functionalized monomers selected from the group consisting of 2-(N,N-dimethylaminomethyl)-1,3-butadiene, 2-(N,N-diethylaminomethyl)-1,3-butadiene, 2-(N,N-di-n-propylaminomethyl)-1,3-butadiene, 2-(cyanomethyl)-1, 3-butadiene, 2-(aminomethyl)-1,3-butadiene, 2-(hydroxymethyl)-1,3-butadiene, 2-(carboxymethy)-1, 3-butadiene, 2-(acetoxymethyl)-1,3-butadiene, 2-(2-alkoxy-2-oxoethyl)-1, 3-butadiene, 2,3-bis(cyanomethyl)-1,3-butadiene, 2,3-bis(dialkylaminomethyl)-1,3-butadiene, 2,3-bis(4-ethoxy-4-4-oxobutyl)-1,3-butadiene and 2,3-bis (3-cyanopropyl)-1,3-butadiene, and methods for preparing such functionalized diene monomers and polymers.

U.S. Pat. No. 6,211,321 discloses a diene rubber comprising 40 to 99.99% by weight of combined units of a conjugated diene monomer, 0 to 50% by weight of combined units of an aromatic vinyl monomer, and 0.01 to 20% by weight of combined units of other vinyl monomer comprising at least one of tertiary amino-containing vinyl monomer and halogen-containing vinyl monomer and wherein at least part of said combined other vinyl monomer is quaternized to form quaternized tertiary amino-containing vinyl monomer units, with the provisos that when said other vinyl monomer comprises combined tertiary amino-containing. vinyl monomer units it is quaternized with a monohalogenated hydrocarbon and when said other vinyl monomer comprises combined halogen-containing vinyl monomer units it is quaternized with a tertiary amine, and having a Mooney viscosity $ML_{1+4}$ at 100° C. of 10 to 200, wherein the tertiary amino-containing vinyl monomer is a compound of the formula $CH_2 = CR^{11} A_2 NR^{12} R^{13}$ where $R^{11}$ is a hydrogen atom or a lower alkyl group, $R^{12}$ and $R^{13}$ are each, independently, an alkyl group, an aryl group or an aralkyl group, $A_2$ is an alkylene group, an arylene group, an arylene-alkylene group, an alkylene-arylene group, or a linking group of the general formula $-C(=O)-M-R^{14}-$, in which M is an oxy group or an NH group, and $R^{14}$ is an alkylene group, an arylene group, an arylene-alkylene group or an alkylene-arylene group, and $R^{12}$ or $R^{13}$ may be combined with $A_2$ to form a heterocyclic ring, and wherein the combined units of the quaternized tertiary amino-containing vinyl monomer have the formula

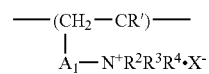

where $R^1$ is a hydrogen atom or a lower alkyl group, $R^2$, $R^3$ and $R^4$, are each, independently, an alkyl group, an aryl group or an aralkyl group, $A_1$ is an alkylene group, an arylene group, an arylene-alkylene group, an alkylene-arylene group, or a linking group of the general formula $-C(=O)-M-R^5-$, in which M is an oxy group or an NH group, and $R^5$ is an alkylene group, an arylene group, an arylene-alkylene group or an alkylene-arylene group, and $R^2$ or $R^3$ may be combined with Al to form a heterocyclic ring, and $X_1$ is a halogen atom.

U.S. Pat. No. 6,057,397 discloses a silica-containing diene rubber composition that is reported to be superior in resiliene (which is an indication of rolling resistance), at least equal, in tensile strength and abrasion resistance, to carbon black-containing diene rubber compositions, and good in processability and hardness characteristics. The silica-containing diene rubber composition disclosed in U.S. Pat. No. 6,057,397 is characterized by containing, as the diene rubber component, a hydroxyl group-containing diene rubber having a weight-average molecular weight of 50,000 or more, or a blend of the hydroxyl group-containing diene rubber and other diene rubber. This composition is produced by a process which uses, as the diene rubber component, a hydroxyl group-containing diene rubber having a weight-average molecular weight of 50,000 or more, or a combination of the hydroxyl group-containing diene rubber and other diene rubber and wherein the mixing of components is conducted by mixing the diene rubber component with at least part of a required amount of silica and then mixing the resulting mixture with the remainder of silica and other compounding agents.

U.S. Pat. No. 6,114,432 is a diene rubber composition comprising 100 parts by weight of a diene rubber component composed of 10–100 weight percent of an amino group-containing diene copolymer rubber (A) having a composition (based on the bound amount) of 40–99.95 weight percent of a conjugated diene monomer, 0.05–20 weight percent of an amino group-containing monomer and 0–55 weight percent of an aromatic vinyl monomer, and 0–90 weight percent of another diene rubber (B), and 10–150 parts by weight of silica having a specific surface area of 50–220 m.sup.2/g as determined by nitrogen absorption (BET method), and having excellent heat build-up resistance, tensile properties, abrasion properties and processability, and a preparation method thereof.

U.S. Pat. No. 6,627,721 discloses a rubbery polymer which is comprised of repeat units that are derived from (1)

at least one conjugated diolefin monomer, and (2) at least one functionalized monomer having of the structural formula:

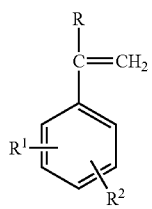

wherein R represents an alkyl group containing from 1 to about 10 carbon atoms or a hydrogen atom, and wherein $R^1$ and $R^2$ can be the same or different and represent hydrogen atoms or a moiety selected from the group consisting of

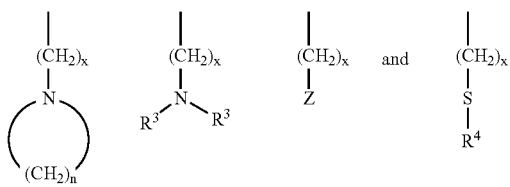

wherein $R^3$ groups can be the same or different and represent alkyl groups containing from 1 to about 10 carbon atoms, aryl groups, allyl groups, and alkyloxy groups of the structural formula $-(CH_2)_y-O-(CH_2)_z-CH_3$, wherein Z represents a nitrogen containing heterocyclic compound, wherein $R^4$ represents a member selected from the group consisting of alkyl groups containing from 1 to about 10 carbon atoms, aryl groups, and allyl groups, and wherein n and x represent integers from 1 to about 10, with the proviso that $R^1$ and $R^2$ can not both be hydrogen atoms.

SUMMARY OF THE INVENTION

The present invention relates to rubbery polymers that exhibit low hysteresis and good compatibility with fillers, such as carbon black and silica. The rubbery polymers of this invention contain repeat units that are derived from one or more conjugated diolefin monomers and at least one monomer that is functionalized with a leaving group, such as a halogen. In any case, improved polymer properties are realized because the rubbery polymers of this invention have improve compatibility with the types of fillers that are typically used in rubber compounds, such as carbon black and silica.

The subject invention more specifically discloses a rubbery polymer which is comprised of repeat units that are derived from (1) at least one conjugated diolefin monomer, and (2) at least one leaving group-bearing monomer having the structural formula:

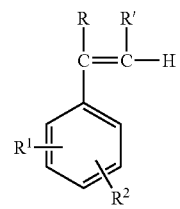

wherein R represents an alkyl group containing from 1 to about 10 carbon atoms or a hydrogen atom, wherein R' represents a methyl group containing from 1 to about 10 carbon atoms or a hydrogen atom, with the proviso that if R represents an alkyl group then R' represents a hydrogen atom, wherein $R^1$ and $R^2$ can be the same or different, wherein $R^1$ represents an alkyl group that is functionalized with a leaving group, wherein $R^2$ represents a moiety selected from the group consisting of hydrogen atoms, alkyl groups containing from 1 to 18 carbon atoms, aryl groups containing from 6 to 18 carbon atoms, alkaryl groups containing from 7 to 18 carbon atoms, and alkyl groups that are functionalized with a leaving group.

The subject invention further reveals a tire which is comprised of a generally toroidal-shaped carcass with an outer circumferential tread, two spaced beads, at least one ply extending from bead to bead and sidewalls extending radially from and connecting said tread to said beads, wherein said tread is adapted to be ground-contacting, and wherein said tread is comprised of (I) a filler, and (II) rubbery polymer which is comprised of repeat units that are derived from (1) at least one conjugated diolefin monomer, and (2) at least one monomer having the structural formula:

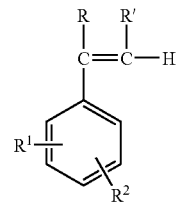

wherein R represents an alkyl group containing from 1 to about 10 carbon atoms or a hydrogen atom, wherein R' represents a methyl group or a hydrogen atom, with the proviso that if R represents an alkyl group then R' represents a hydrogen atom, wherein $R^1$ and $R^2$ can be the same or different, wherein $R^1$ represents an alkyl group that is functionalized with a leaving group, wherein $R^2$ represents a moiety selected from the group consisting of hydrogen atoms, alkyl groups containing from 1 to 18 carbon atoms, aryl groups containing from 6 to 18 carbon atoms, alkaryl groups containing from 7 to 18 carbon atoms, and alkyl groups that are functionalized with a leaving group.

DETAILED DESCRIPTION OF THE INVENTION

The rubbery polymers of this invention are synthesized by copolymerizing at least one monomer that contains a leaving group with a conjugated diolefin monomer. The monomer containing leaving groups can be copolymerized with more than one conjugated diolefin monomer, and optionally, other monomers that are copolymerizable with conjugated diolefin monomers, such as vinyl aromatic monomers. In any case, typically from about 0.1 phm (parts by weight by 100 parts by weight of monomers) to about 25 phm of the leaving group-bearing monomer will be included in the polymerization. More typically, from about 0.2 phm to about 10 phm of the leaving group-bearing monomer will be incorporated into the rubbery polymer. It is normally preferred to incorporate 0.5 phm to 5 phm of the leaving group-bearing monomer into the rubbery polymer.

The leaving group-bearing monomers that are utilized in synthesizing the rubbery polymers of this invention are of the structural formula:

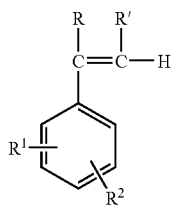

wherein R represents an alkyl group containing from 1 to about 10 carbon atoms or a hydrogen atom, wherein R' represents a methyl group or a hydrogen atom, with the proviso that if R represents an alkyl group then R' represents a hydrogen atom (R and R' cannot both be alkyl groups), wherein $R^1$ and $R^2$ can be the same or different, wherein $R^1$ represents an alkyl group that is functionalized with a leaving group, wherein $R^2$ represents a moiety selected from the group consisting of hydrogen atoms, alkyl groups containing from 1 to 18 carbon atoms, aryl groups containing from 6 to 18 carbon atoms, alkaryl groups containing from 7 to 18 carbon atoms, and alkyl groups that are functionalized with a leaving group.

The leaving group-bearing monomers that are utilized in synthesizing the rubbery polymers of this invention are typically of the structural formula:

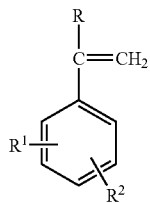

wherein R represents an alkyl group containing from 1 to about 10 carbon atoms or a hydrogen atom, and wherein $R^1$ and $R^2$ can be the same or different, wherein $R^1$ represents an alkyl group that is functionalized with a leaving group, wherein $R^2$ represents a moiety selected from the group consisting of hydrogen atoms, alkyl groups containing from 1 to 12 carbon atoms, aryl groups containing from 6 to 18 carbon atoms, alkaryl groups containing from 7 to 18 carbon atoms, and alkyl groups that are functionalized with a leaving group. In these leaving group-bearing monomers R will preferably represent a hydrogen atom or an alkyl group containing from 1 to 4 carbon atoms. R will most preferably represent a hydrogen atom. $R^2$ will normally represent a hydrogen atom or an alkyl group containing from 1 to 4 carbon atoms. It is generally preferred for $R^2$ to represent a hydrogen atom. It is important for at least one leaving group to be on a benzylic carbon atom.

The leaving group-bearing monomers that are preferred for utilization in the practice of this invention are of the structural formula:

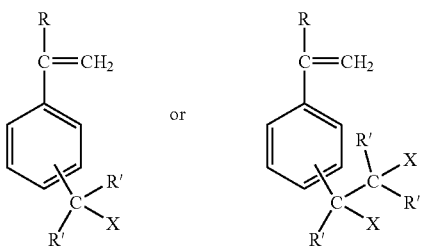

wherein R represents a hydrogen atom or an alkyl group containing from 1 to 10 carbon atoms, wherein the R' groups can be the same or different and are selected from hydrogen atoms and alkyl groups containing from 1 to 4 carbon atoms, and wherein X represents a leaving group. It is normally preferred for R to represent a hydrogen atom and for the R' groups to represent hydrogen atoms or methyl groups. The leaving group (X) will be a moiety that is capable of forming a stable anion. Some representative examples of suitable leaving groups include —F, —Cl, —Br, —I, —SCN, —NCS, —OCN, —NCO, and the like. The leaving group will preferably be a halogen atom, such as chlorine, bromine, or iodine. Chlorine is generally the most preferred leaving group.

According to this invention, polymerization and recovery of polymer are suitably carried out according to various methods suitable for diene monomer polymerization processes. This includes batch, semi-continuous, or continuous operations under conditions that exclude air and other atmospheric impurities, particularly oxygen. The polymerization of the leaving group-bearing monomers containing leaving groups can also be carried out in a number of different polymerization reactor systems, including but not limited to bulk polymerization, vapor phase polymerization, solution polymerization, suspension polymerization, and emulsion polymerization. The commercially preferred method of polymerization is emulsion polymerization.

Essentially any type of free radical generator can be used to initiate such free radical emulsion polymerizations. For example, free radical generating chemical compounds, ultraviolet light or radiation can be used. In order to ensure a satisfactory polymerization rate, uniformity and a controllable polymerization, free radical generating chemical agents which are water- or oil-soluble under the polymerization conditions are generally used with good results.

Some representative examples of free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl acetone peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, and the like; the various alkyl perketals, such as 2,2-bis-(t-butylperoxy)butane, ethyl 3,3-bis(t-butylperoxy) butyrate, 1,1-di-(t-butylperoxy)cyclohexane, and the like. Persulfate initiators, such as potassium persulfate and ammonium persulfate, are especially useful in such aqueous emulsion polymerizations.

The rubbery polymers of this invention can also be synthesized with free radicals that are generated utilizing redox initiators, such as combinations of chelated iron salts, sodium formaldehyde sulfoxylate, and organic hydroperoxides. Some representative examples of such organic hydroperoxides include cumene hydroperoxide, paramenthane hydroperoxide, and tertiary butyl hydroperoxide. Tertiary butyl hydroperoxide (t-BHP), tertiary butyl peracetate (t-BPA) and "azo" initiators, such as azobisiobutyronitrile (AIBN), are preferred for use in generating free radicals.

The amount of initiator employed will vary with the desired molecular weight of the rubbery polymer being synthesized. Higher molecular weights are achieved by utilizing smaller quantities of the initiator and lower molecular weights are attained by employing larger quantities of the initiator. However, as a general rule, from 0.005 to 1 phm (parts by weight per 100 parts by weight of monomer) of the initiator will be included in the reaction mixture. In the case of metal persulfate initiators, typically from 0.1 phm to 0.5 phm of the initiator will be employed in the polymerization medium. The molecular weight of the rubbery polymer produced is, of course, also dependent upon the amount of chain transfer agent, such as t-dodecyl mercaptan, present during the polymerization. For instance, low molecular weight rubbery polymers can be synthesized by simply increasing the level of chain transfer agent. As a specific example, in the synthesis of high molecular weight SBR, the amount of t-dodecyl mercaptan used can be within the range of about 0.125 phm to about 0.150 phm. Low molecular weight rubbery polymers can be produced by simply increasing the level of t-dodecyl mercaptan present during the polymerization. For instance, the presence of 0.38 phm to 0.40 phm of t-dodecyl mercaptan will typically result in the synthesis of a low molecular weight rubbery polymer.

In batch operations, the polymerization time of leaving group-bearing diene monomers can be varied as desired; it may vary, for example, from a few minutes to several days. Polymerization in batch processes may be terminated when monomer is no longer absorbed, or earlier, if desired, e.g., if the reaction mixture becomes too viscous. In continuous operations, the polymerization mixture may be passed through a reactor of any suitable design. The polymerization reactions in such cases are suitably adjusted by varying the residence time. Residence times vary with the type of reactor system and range, for example, from 10 to 15 minutes to 24 or more hours.

Conventional emulsion recipes may also be employed with the present invention; however, some restrictions and modifications may arise either from the polymerizable monomer itself, or the polymerization parameters. Ionic surfactants, known in the art, including sulfonate detergents and carboxylate, sulfate, and phosphate soaps are useful in this invention. The level of ionic surfactant is computed based upon the total weight of the organic components and may range from about 2 to 30 parts by weight of ionic surfactant per 100 parts by weight of organic components.

Preferably the polymerization is carried out to a high conversion of the leaving group-bearing monomers to incorporate essentially all of the leaving group-bearing monomer into the rubbery polymer. Incremental addition, or a chain transfer agent, may be used in order to avoid excessive gel formation. Such minor modifications are within the skill of the artisan. After the polymerization is complete, the polymer is recovered from a slurry or solution of the polymer. A simple filtration may be adequate to separate polymer from diluent. Other means for separating polymer from diluent may be employed. The polymer may be treated, separately or while slurried in the reaction mixture, in order to separate residues. Such treatment may be with alcohols such as methanol, ethanol, or isopropanol, with acidified alcohols, or with other similar polar liquids. In many cases the polymers are obtained in hydrocarbon solutions and the polymer can be recovered by coagulation with acidified alcohol, e.g., rapidly stirred methanol or isopropanol containing 2% hydrochloric acid. Following this initial coagulation,the polymers may be washed several more times in methanol.

The leaving group-bearing monomers can also be polymerized with one or more comonomers. Some adjustments in the polymerization recipe or reaction conditions may be necessary to obtain a satisfactory rate of polymer formation, depending on the amount of leaving group-bearing monomer included and the other monomers involved. Examples of comonomers that are useful in the practice of this invention are diene monomers such as 1,3-butadiene, isoprene, and hexadienes. One may, in addition to the diene monomers, use a vinyl monomer such as styrene, α-methylstyrene, divinyl benzene, vinyl chloride, vinyl acetate, vinylidene chloride, methyl methacrylate, ethyl acrylate, vinylpyridine, acrylonitrile, methacrylonitrile, methacrylic acid, itaconic acid and acrylic acid. Mixtures of different leaving group-bearing monomers and mixtures of different comonomers may be used. The monomer charge ratio by weight is normally from about 0.10/99.9 to 25/75 leaving group-bearing monomer to comonomer (including any vinyl aromatic monomer that can optionally be used). A charge ratio by weight of about 0.2/99.8 to about 10/90 is preferred with 0.5/99.5 to 5/95 being more preferred. In. cases where vinyl aromatic monomers are included, the level of the vinyl aromatic monomer will typically be less than 45 weight percent. Vinyl aromatic monomers are typically utilized at a level which is within the range of about 15 weight percent to about 30 weight percent. Ratios will vary depending on the amount of chemical functionality desired to be incorporated and on the reactivity ratios of the monomers in the particular polymerization system used.

The leaving group-bearing monomers utilized in accordance with the technique of this invention offer a unique ability to randomly copolymerize with conjugated diolefin monomers in emulsion polymerizations. The leaving group-bearing monomers can be incorporated into virtually any type of rubbery polymer that is capable of being made by emulsion polymerization with a free radical initiator. The polymerization employed in synthesizing the rubbery polymers will normally be carried out in an aqueous medium that includes water, an emulsifier, the monomers, and a free radical initiator system.

The synthetic rubbers made by the process of this invention can be made by random copolymerization of the leaving group-bearing monomers with a conjugated diolefin monomer or by the random terpolymerization of the leaving group-bearing monomers with a conjugated diolefin monomer and a vinyl aromatic monomer. It is, of course, also possible to make such rubbery polymers by polymerizing a mixture of conjugated diolefin monomers with one or more ethylenically unsaturated monomers, such as vinyl aromatic monomers. The conjugated diolefin monomers which can be utilized in the synthesis of rubbery polymers which can be coupled in accordance with this invention generally contain from 4 to 12 carbon atoms. Those containing from 4 to 8 carbon atoms are generally preferred for commercial purposes. For similar reasons, 1,3-butadiene and isoprene are the most commonly utilized conjugated diolefin monomers. Some additional conjugated diolefin monomers that can be utilized include 2,3-dimethyl-1,3-butadiene, piperylene, 3-butyl-1,3-octadiene, 2-phenyl-1,3-butadiene, and the like, alone or in admixture.

Some representative examples of ethylenically unsaturated monomers that can potentially be polymerized into rubbery polymers that contain the leaving group-bearing monomers include alkyl acrylates, such as methyl acrylate, ethyl acrylate, butyl acrylate, methyl methacrylate and the like; vinylidene monomers having one or more terminal $CH_2=CH-$ groups; vinyl aromatics such as styrene, α-methylstyrene, bromostyrene, chlorostyrene, fluorostyrene and the like; α-olefins such as ethylene, propylene, 1-butene and the like; vinyl halides, such as vinylbromide, chloroethene (vinylchloride), vinylfluoride, vinyliodide, 1,2-dibromoethene, 1,1-dichloroethene (vinylidene chloride), 1,2-dichloroethene and the like; vinyl esters, such as vinyl acetate; α,β-olefinically unsaturated nitriles, such as acrylonitrile and methacrylonitrile; α,β-olefinically unsaturated amides, such as acrylamide, N-methyl acrylamide, N,N-dimethylacrylamide, methacrylamide and the like.

Rubbery polymers which are copolymers of one or more diene monomers with one or more other ethylenically unsaturated monomers will normally contain from about 50 weight percent to about 99 weight percent conjugated diolefin monomers and from about 1 weight percent to about 50 weight percent of the other ethylenically unsaturated monomers in addition to the conjugated diolefin monomers. For example, copolymers of conjugated diolefin monomers with vinylaromatic monomers, such as styrene-butadiene rubbers which contain from 50 to 95 weight percent conjugated diolefin monomers and from 5 to 50 weight percent vinylaromatic monomers, are useful in many applications.

Vinyl aromatic monomers are probably the most important group of ethylenically unsaturated monomers which are commonly incorporated into polydiene rubbers. Such vinyl aromatic monomers are, of course, selected so as to be copolymerizable with the conjugated diolefin monomers being utilized. Generally, any vinyl aromatic monomer which is known to polymerize with free radical initiators can be used. Such vinyl aromatic monomers typically contain from 8 to 20 carbon atoms. Usually, the vinyl aromatic monomer will contain from 8 to 14 carbon atoms. The most widely used vinyl aromatic monomer is styrene. Some examples of vinyl aromatic monomers that can be utilized include styrene, 1-vinylnaphthalene, 2-vinylnaphthalene, α-methylstyrene, 4-phenylstyrene, 3-methylstyrene and the like.

Some representative examples of rubbery polymers that can be functionalized with leaving group-bearing monomers include polybutadiene, polyisoprene, styrene-butadiene rubber (SBR), α-methylstyrene-butadiene rubber, α-methylstyrene-isoprene rubber, styrene-isoprene-butadiene rubber (SIBR), styrene-isoprene rubber (SIR), isoprene-butadiene rubber (IBR), α-methylstyrene-isoprene-butadiene rubber and α-methylstyrene-styrene-isoprene-butadiene rubber. In cases where the rubbery polymer is comprised of repeat units that are derived from two or more monomers, the repeat units which are derived from the different monomers, including the leaving group-bearing monomers, will normally be distributed in an essentially random manner. The repeat units that are derived from the monomers differ from the monomer in that a double bond is normally consumed by the polymerization reaction.

The rubbery polymer can be made by emulsion polymerization in a batch process or in a continuous process by continuously charging at least one conjugated diolefin monomer, the leaving group-bearing monomer, and any additional monomers into a polymerization zone. The polymerization zone will typically be a polymerization reactor or a series of polymerization reactors. The polymerization zone will normally provide agitation to keep the emulsified system well dispersed throughout the aqueous polymerization zone. Such continuous polymerizations are typically conducted in a multiple reactor system. The rubbery polymer synthesized is continuously withdrawn from the polymerization zone. The monomer conversion attained in the polymerization zone will normally be about 65 percent.

The soap systems used in the emulsion polymerization process will frequently contain a combination of rosin acid and fatty acid emulsifiers. The weight ratio of fatty acid soaps to rosin acid soaps will typically be within the range of about 50:50 to 90:10. It is normally preferred for the weight ratio of fatty acid soaps to rosin acid soaps to be within the range of 60:40 to 85:15. It is normally more preferred for the weight ratio of fatty acid soaps to rosin acid soaps to be within the range of 75:25 to 82:18. All of the soap is typically charged into the first polymerization zone. The total amount of soap employed will normally be less than 5 phm. The quantity of soap employed will normally be within the range of about 1 phm to 4 phm. It is typically preferred to utilize a level of soap which is within the range of about 2 phm to about 3.0 phm. The precise amount of the soap system required in order to attain optimal results will, of course, vary with the specific soap system being used. However, persons skilled in the art will be able to easily ascertain the specific amount of soap system required in order to attain optimal results.

The free radical emulsion polymerization will typically be conducted at a temperature which is within the range of about 35° F. (2° C.) to about 65° F. (18° C.). It is generally preferred for the polymerization to be carried out at a temperature which is within the range of 40° F. (4° C.) to about 60° F. (16° C.). It is typically more preferred to utilize a polymerization temperature which is within the range of about 45° F. (7° C.) to about 55° F. (13° C.). To increase conversion levels, it can be advantageous to increase the temperature as the polymerization proceeds.

After the desired monomer conversion is reached, the rubbery polymer latex made is removed from the polymerization zone and a short stop is added to terminate the polymerization. Then the latex is coagulated and the rubbery polymer is recovered.

The rubbery polymers of this invention can be compounded utilizing conventional ingredients and standard techniques. For instance, such rubber blends will typically be mixed with carbon black and/or silica, sulfur, fillers, accelerators, oils, waxes, scorch inhibiting agents and processing aids. In most cases, the emulsion SBR blend will be compounded with sulfur and/or a sulfur-containing compound, at least one filler, at least one accelerator, at least one antidegradant, at least one processing oil, zinc oxide, optionally a tackifier resin, optionally a reinforcing resin, optionally one or more fatty acids, optionally a peptizer and optionally one or more scorch inhibiting agents. Such blends will normally contain from about 0.5 to 5 phr (parts per hundred parts of rubber by weight) of sulfur and/or a sulfur-containing compound with 1 phr to 2.5 phr being preferred. It may be desirable to utilize insoluble sulfur in cases where bloom is a problem.

Normally from 10 to 150 phr of at least one filler will be utilized in the blend with 30 to 80 phr being preferred. In most cases, at least some carbon black will be utilized in the filler. The filler can, of course, be comprised totally of carbon black. Silica and/or organic fillers such as starch can be included in the filler to improve tear resistance and heat buildup. Clays and/or talc can be included in the filler to reduce cost. The blend will also normally include from 0.1 to 2.5 phr of at least one accelerator with 0.2 to 1.5 phr being preferred. Antidegradants, such as antioxidants and antiozonants, will generally be included in the tread compound blend in amounts ranging from 0.25 to 10 phr with amounts in the range of 1 to 5 phr being preferred. Processing oils will generally be included in the blend in amounts ranging from 2 to 100 phr with amounts ranging from 5 to 50 phr being preferred. The rubber blends of this invention will also normally contain from 0.5 to 10 phr of zinc oxide with 1 to 5 phr being preferred. These blends can optionally contain from 0 to 10 phr of tackifier resins, 0 to 10 phr of reinforcing resins, 1 to 10 phr of fatty acids, 0 to 2.5 phr of peptizers and 0 to 2 phr of scorch inhibiting agents.

The polymers of the present invention can be used alone or in combination with other elastomers to prepare rubber compounds, such as a tire treadstock, sidewall stock or other tire component stock compounds. In a tire of the invention, at least one such component is produced from a vulcanizable elastomeric or rubber composition. For example, the rubbery polymer made by the process of this invention can be blended with any conventionally employed treadstock rubber which includes natural rubber, synthetic rubber and blends thereof. Such rubbers are well known to those skilled in the art and include synthetic polyisoprene rubber, styrene/butadiene rubber (SBR), polybutadiene, butyl rubber, Neoprene, ethylene/propylene rubber, ethylene/propylene/diene rubber (EPDM), acrylonitrile/butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene/propylene rubber and the like.

When the rubbery polymers made by the process of the present invention are blended with conventional rubbers, the amounts can vary widely such as between 10 and 99 percent by weight. In any case, tires made with synthetic rubbers that are synthesized utilizing the technique of this invention exhibit decreased rolling resistance. The greatest benefits are realized in cases where the tire tread compound is made with the rubbery polymer synthesized utilizing the technique of this invention. However, benefits can also by attained in cases where at least one structural element of the tire, such as subtread, sidewalls, body ply skim, or bead filler, is comprised of the rubbery polymer.

The synthetic rubbers made in accordance with this invention can be compounded with carbon black in amounts ranging from about 5 to about 100 phr (parts by weight per 100 parts by weight of rubber), with about 5 to about 80 phr being preferred, and with about 40 to about 70 phr being more preferred. The carbon blacks may include any of the commonly available, commercially-produced carbon blacks but those having a surface area (EMSA) of at least 20 m$^2$/g and more preferably at least 35 m$^2$/g up to 200 m$^2$/g or higher are preferred. Surface area values used in this application are those determined by ASTM test D-1765 using the cetyltrimethyl-ammonium bromide (CTAB) technique.

Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above blacks can be used in preparing the carbon black products of the invention. Typical values for surface areas of usable carbon blacks are summarized in the following table.

| Carbon Black | |
|---|---|
| ASTM Designation (D-1765-82a) | Surface Area (D-3765) |
| N-110 | 126 m$^2$/g |
| N-220 | 111 m$^2$/g |
| N-330 | 83 m$^2$/g |
| N-339 | 95 m$^2$/g |
| N-550 | 42 m$^2$/g |
| N-660 | 35 m$^2$/g |

The carbon blacks utilized in the preparation of rubber compounds may be in pelletized form or an unpelletized flocculent mass. Preferably, for more uniform mixing, unpelletized carbon black is preferred. The reinforced rubber compounds can be cured in a conventional manner with about 0.5 to about 4 phr of known vulcanizing agents. For example, sulfur or peroxide-based curing systems may be employed. For a general disclosure of. suitable vulcanizing agents one can refer to Kirk-Othmer, Encyclopedia of Chemical Technology, 3rd ed., Wiley Interscience, N.Y. 1982, Vol. 20, pp. 365–468, particularly "Vulcanization Agents and Auxiliary Materials" pp. 390–402. Vulcanizing agents can, of course, be used alone or in combination. Vulcanizable elastomeric or rubber compositions can be prepared by compounding or mixing the polymers thereof with carbon black and other conventional rubber additives such as fillers, plasticizers, antioxidants, curing agents and the like, using standard rubber mixing equipment and procedures and conventional amounts of such additives.

To realize the maximum benefits of this invention, it will be advantageous to include silica in the tread rubber formulation made with the rubbery polymers of this invention. The processing of the rubbery elastomer is normally conducted in the presence of a sulfur containing organosilicon compound (silica coupler) to realize maximum benefits. Examples of suitable sulfur-containing organosilicon compounds are of the formula:

 (I)

in which Z is selected from the group consisting of:

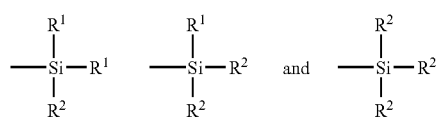

where R$^1$ is an alkyl group of 1 to 4 carbon atoms, cyclohexyl or phenyl; wherein R$^2$ is an alkoxy group containing 1 to 8 carbon atoms or a cycloalkoxy group containing 5 to 8 carbon atoms; and wherein Alk is a divalent hydrocarbon of 1 to 18 carbon atoms and n is an integer of 2 to 8.

Specific examples of sulfur-containing organosilicon compounds which may be used in accordance with the present invention include: 3,3'-bis(trimethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis(trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl)tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis(dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide.

The preferred sulfur-containing organosilicon compounds are the 3,3'-bis(trimethoxy or triethoxy silylpropyl) sulfides. The most preferred compound is 3,3'-bis(triethoxysilylpropyl) tetrasulfide. Therefore, as to Formula I, preferably Z is

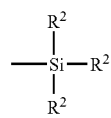

where $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred.

The amount of the sulfur-containing organosilicon compound of Formula I in a rubber composition will vary, depending on the level of silica that is used. Generally speaking, the amount of the compound of Formula I will range from about 0.01 to about 1.0 parts by weight per part by weight of the silica. Preferably, the amount will range from about 0.02 to about 0.4 parts by weight per part by weight of the silica. More preferably, the amount of the compound of Formula I will range from about 0.05 to about 0.25 parts by weight per part by weight of the silica.

In addition to the sulfur-containing organosilicon, the rubber composition should contain a sufficient amount of silica, and carbon black, if used, to contribute a reasonably high modulus and high resistance to tear. The silica filler may be added in amounts ranging from about 10 phr to about 250 phr. Preferably, the silica is present in an amount ranging from about 15 phr to about 80 phr. If carbon black is also present, the amount of carbon black, if used, may vary. Generally speaking, the amount of carbon black will vary from about 5 phr to about 80 phr. Preferably, the amount of carbon black will range from about 10 phr to about 40 phr. It is to be appreciated that the silica coupler may be used in conjunction with a carbon black; namely, pre-mixed with a carbon black prior to addition to the rubber composition and such carbon black is to be included in the aforesaid amount of carbon black for the rubber composition formulation. In any case, the total quantity of silica and carbon black will be at least about 30 phr. The combined weight of the silica and carbon black, as hereinbefore referenced, may be as low as about 30 phr, but is preferably from about 45 to about 130 phr.

The commonly employed siliceous pigments used in rubber compounding applications can be used as the silica in this invention, including pyrogenic and precipitated siliceous pigments (silica), although precipitate silicas are preferred. The siliceous pigments preferably employed in this invention are precipitated silicas such as, for example, those obtained by the acidification of a soluble silicate; e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the Journal of the American Chemical Society, Volume 60, page 304 (1930).

The silica may also be typically characterized by having a dibutylphthalate (DBP) absorption value in a range of about 100 to about 400, and more usually about 150 to about 300. The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3.

Tire tread formulations which include silica and an organosilicon compound will typically be mixed utilizing a thermomechanical mixing technique. The mixing of the tire tread rubber formulation can be accomplished by methods known to those having skill in the rubber mixing art. For example, the ingredients are typically mixed in at least two stages; namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The rubber, silica and sulfur-containing organosilicon, and carbon black if used, are mixed in one or more non-productive mix stages. The terms "non-productive" and "productive" mix stages are well known to those having skill in the rubber mixing art. The sulfur-vulcanizable rubber composition containing the sulfur-containing organosilicon compound, vulcanizable rubber and generally at least part of the silica should be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be for a duration of time which is within the range of about 2 minutes to about 20 minutes. It will normally be preferred for the rubber to reach a temperature which is within the range of about 145° C. to about 180° C. and to be maintained at said temperature for a period of time which is within the range of about 4 minutes to about 12 minutes. It will normally be more preferred for the rubber to reach a temperature which is within the range of about 155° C. to about 170° C. and to be maintained at said temperature for a period of time which is within the range of about 5 minutes to about 10 minutes.

The emulsion SBR containing tire tread compounds of this invention can be used in tire treads in conjunction with ordinary tire manufacturing techniques. Tires are built utilizing standard procedures with the emulsion SBR of this invention being substituted for the rubber compounds typically used as the tread rubber. After the tire has been built with the emulsion SBR containing blend, it can be vulcanized using a normal tire cure cycle. Tires made in accordance with this invention can be cured over a wide temperature range. However, it is generally preferred for the tires of this invention to be cured at a temperature ranging from about 132° C. (270° F.) to about 166° C. (330° F.). It is more typical for the tires of this invention to be cured at a temperature ranging from about 143° C. (290° F.) to about 154° C. (310° F.). It is generally preferred for the cure cycle used to vulcanize the tires of this invention to have a duration of about 10 to about 20 minutes with a cure cycle of about 12 to about 18 minutes being most preferred.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLES

In these experiments, 4-vinylbenzyl chloride (95%, Fluka), hexane, and acetone were used without further purification. Monomer characterization was performed using nuclear magnetic resonance on a Varian Mercury 300 MHz.

Bound styrene and vinyl contents were determined by nuclear magnetic resonance ($^1$H NMR) using a Unityplus 400 MHz. Molecular weight and molecular weight distribution was determined using thermal field flow fractionation on a LCC Fractionator Model T-100 (FFFractionation) using tetrahydrofuran as carrier solvent and for sample preparation. MALLS measurements were carried out using a Wyatt Technologies Dawn DSP light scattering detector and a Hewlett Packard 1047A refractive index detector. Raw polymer Mooney viscosity testing was performed on an Alpha Technologies Mooney 200 viscometer according to the guidelines established for ASTM D 1646-00, *Annual Book of ASTM Standards,* 9.01, 318 (2001). Glass transition temperature analyses were performed on a TA Instruments 2910 MDSC using a 2° C./min linear heat rate and a helium flow rate of 25 ml/min.

Oscillatory shear testing was performed on an Alpha Rubber Process Analyzer 2000 under varied frequencies and strains at 100° C. Zwick Rebound measurements were performed according to ASTM D1054 at 100° C. Insoluble rubber was measured on the pre-cured rubber compounds using the following procedure. A small pre-weighed amount of original sample was placed in THF and shaken for 24 hours at room temperature. The supernatant liquid was removed and passed through a 0.45 micrometer filter before being injected on an SEC apparatus equivalent to that outlined above. Soluble polymer is determined from the calculated mass as measured by a calibrated refractive index detector. Insoluble rubber is calculated as shown in Equations 1 and 2.

Soluble Polymer (%)=(Soluble Polymer Weight× 100)/(Original Sample Weight)   Equation 1.

Insoluble Polymer (%)=[(Total Polymer−Soluble Polymer) ×100]/(Total Polymer)   Equation 2.

Total Polymer is equal to the weight percent polymer in the compound formulation.

Monomer Synthesis

Synthesis of 4-vinylbenzyl iodide

Sodium iodide (1.2 equiv., 59 g, 0.39 mol) was dissolved in acetone (200 ml) and 4-vinylbenzyl chloride (50 g, 0.33 mol) was added to a reaction flask. The mixture was stirred at room temperature overnight. The reaction mixture was filtered and acetone removed under reduced pressure. The resulting product was dissolved in hexane, filtered, and the solvent removed under reduced pressure. The monomer was isolated as a red, slightly viscous liquid (68 g, yield 84%).

$^1$H NMR (CDCl$_3$) δ (ppm) 4.47 (s, 2H), 5.25 (d, 1H), 5.74 (d, 1H), 6.65 (dd, 1H), 7.34 (m, 4H).

Synthesis of 4-vinylbenzyl thiocyanate

Ammonium thiocyanate (2 equiv., 43 g, 0.50 mol) was dissolved in acetone (200 ml) and 4-vinylbenzyl chloride (43 g, 0.25 mol) was added to the reaction flask. The mixture was stirred at room temperature overnight. The reaction mixture was filtered and acetone removed under reduced pressure. The resulting product was dissolved in hexane, filtered, and the solvent removed under reduced pressure. The monomer was isolated as a red-orange, slightly viscous liquid (26 g, yield 52%). $^1$H NMR (CDCl$_3$) δ (ppm) 4.13 (s, 2H), 5.29 (d, 1H), 5.76 (d, 1H), 6.67 (dd, 1H), 7.31 (m, 4H).

Synthesis of 4-vinylbenzyl bromide

Ammonium bromide (2 equiv., 38 g, 0.50 mol) was dissolved in acetone (250 ml) and 4-vinylbenzyl chloride (38 g, 0.25 mol) was added to a glass pressure vessel. The mixture was stirred at 60° C. for 3 weeks. At weekly intervals, the salts were filtered and additional ammonium bromide was added (1 equiv.). After 3 weeks, the reaction mixture was filtered and the acetone removed under reduced pressure. The resulting product was dissolved in hexane, filtered, and the solvent removed under reduced pressure. The monomer was isolated as a yellow, slightly viscous liquid containing 4-vinylbenzyl bromide (70%) and 4-vinylbenzyl chloride (30%) (33 g, yield 47%). 4-vinylbenzyl bromide: $^1$H NMR (CDCl$_3$) δ (ppm) 4.50 (s, 2H), 5.26 (d, 1H), 5.74 (d, 1H), 6.66 (dd, 1H), 7.34 (m, 4H).

Polymer Synthesis

A reaction vessel (2 gallon capacity) equipped with a stirring mechanism was used to prepare the functional poly(styrene-co-butadiene) rubbers and controls. A representative recipe for the emulsion polymerization is given in Table 1. The polymerization temperature was held constant at 10° C. Distilled water and the solutions of rosin acid and fatty acid soaps were added to the reactor, followed by the electrolytes potassium phosphate and potassium chloride in addition to the sodium naphthalenesulfonate-formaldehyde copolymer dispersant.

The styrene and butadiene monomers were subsequently added with any leaving group-bearing monomers also being charged (1 part). The mercaptan chain transfer agent was charged with the styrene monomer. To this emulsion was added the redox components of the initiating system (chelated iron complex and reducing agent), followed by the hydroperoxide. Care was taken to eliminate spurious oxygen from the above components and the reactor itself. The emulsion was buffered with potassium hydroxide to a pH of 10.5–11.0. The reaction was terminated with isopropylhydroxyamine at approximately 65% conversion of monomer (24% solids). A phosphite antioxidant was added as a stabilizer. Residual volatiles was stripped from the latex under reduced pressure. The latex was coagulated under acidic conditions.

TABLE 1

Representative Recipe.

| Ingredient | Active Parts |
|---|---|
| Water | 200.00 |
| Potassium salt of hydrogenated mixed fatty acid (soap), 10% solution | 2.34 |
| Potassium resinate (soap), 20% solution | 1.38 |
| Potassium chloride | 0.23 |
| Potassium phosphate | 0.05 |
| Sodium naphthalenesulfonate-formaldehyde copolymer dispersant, 48% solution | 0.14 |
| Potassium hydroxide | 0.14 |
| Styrene | 29.00 |
| Mercaptan | 0.32 |
| Butadiene | 70.00 |
| Functionalized monomer | 1.00 |
| Sodium formaldehyde sulfoxylate | 0.05 |
| Sodium ferric ethylenediaminetetraacetate, 1% solution | 0.02 |
| Pinane hydroperoxide | 0.04 |
| Isopropylhydroxylamine | 0.06 |

Example 1

The synthesis of Polymers A and B utilized 4-vinylbenzyl chloride (95%) as the halogenated functionalized monomer (leaving group-bearing monomer) and the polymerization procedure followed the recipe outlined in table 1.

Example 2

The synthesis of Polymers C utilized a mixture of 4-vinylbenzyl bromide (70%) and 4-vinylbenzyl chloride (30%) as the halogenated functionalized monomer and the polymerization procedure followed the recipe outlined in table 1.

Example 3

The synthesis of Polymers D utilized 4-vinylbenzyl thiocyanate as the functionalized monomer and the polymerization procedure followed the recipe outlined in table 1.

Example 4

The synthesis of Polymers E and F did not utilize a functionalized monomer in the polymerization and were provided as the comparative controls. In these cases, styrene was charged at 30 parts.

Polymer Characterization

Table 2 outlines the characterization data of the sample polymers A–F. In each case where functionalized monomer was included, the charge was 1.0 part.

TABLE 2

Polymer characterization.

| Polymer | Functional Monomer | Mooney Viscosity | Mn (kg/mol) | Mw (kg/mol) | Mw/Mn | Styrene (wt %) | Vinyl (wt %) | Tg (onset, °C.) |
|---|---|---|---|---|---|---|---|---|
| A | 4-vinylbenzyl chloride | 39 | 1.85 | 51.4 | 28 | 21 | 13 | −58 |
| B | 4-vinylbenzyl chloride | 64 | 3.14 | 34.9 | 11 | 23 | 11 | −58 |
| C | 4-vinylbenzyl bromide | 53 | 2.63 | 20 | 8 | 24 | 11 | −58 |
| D | 4-vinylbenzyl thiocyanate | 65 | 2.68 | 84.7 | 32 | 25 | 13 | −56 |
| E | control | 34 | 4.54 | 71.3 | 16 | 25 | 12 | −57 |
| F | control | 59 | 2.89 | 66.5 | 23 | 26 | 11 | −54 |

The above polymers A–F were compounded in two different formulations, one containing carbon black as the sole filler and one containing silica as the primary filler. Representative formulations are given in Table 3 and 4.

TABLE 3

Carbon black formulation.

| Ingredient | phr |
|---|---|
| Polymer | 100.0 |
| Carbon black (N299) | 55.0 |
| Aromatic oil | 10.0 |
| Zinc oxide | 3.0 |
| Stearic acid | 2.0 |
| 2,2,4-Trimethyl-1,2-dihydroquinoline | 1.5 |
| Sulfur | 1.4 |
| N-Cyclohexyl-2-benzothiazolesulfenamide | 1.2 |

TABLE 4

Silica formulation.

| Ingredient | phr |
|---|---|
| Polymer | 100.0 |
| Silica (Zeosil 1165) | 60.0 |
| Silane coupling agent* | 9.6 |
| Aromatic oil | 17.5 |
| Microcrystalline Wax | 1.0 |
| Paraffin Wax | 0.5 |
| N-(1,3-Dimethylbutyl)-N'-phenyl-p-phenylenediamine | 2.5 |
| Stearic acid | 3.0 |
| Mixed diaryl-p-phenylenediamine | 0.5 |
| Zinc Oxide | 2.5 |
| N-Cyclohexyl-2-benzothiazolesulfenamide | 2.0 |
| Diphenylguanidine | 1.6 |

TABLE 4-continued

Silica formulation.

| Ingredient | phr |
|---|---|
| Sulfur | 1.7 |

*50/50 wt/wt. on Carbon black

The non-productive stage of the silica-filled formulation was heat-treated by holding the mix at 160° C. for two minutes. No heat treatment was used for the carbon black-filled formulation.

The dynamic properties of the resultant uncured and cured stocks were analyzed to determine if polymer-filler interaction was enhanced due to the presence of the functionalized monomers incorporated in Polymers A-D. Dynamic modulus (G' @ 0.833 Hz, 15% strain, 100° C.) is a measurement that can account for increased polymer-filler interaction in the uncured state. In the cured state, a decrease in the Payne Effect (as measured by the ratio of G' @ 1% strain to G' @ 14% strain, 100° C., 11Hz) and lower tangent delta values at various strains (10%, 100° C., 11 Hz) provide indications of hysteresis reductions. Rebound testing also provides a correlation to hysteretic loss. Improvements in polymer-filler interaction will be manifested in test results that indicate lower hysteresis. Insoluble polymer measurements provides a more direct quantification of the bound rubber. The results of these measurements are outlined in Table 5 and 6 for the carbon black and silica-filled recipes, respectively. Each productive compound had similar states of cure as measured by the difference in minimum and maximum rheometer torque values. All values are normalized to the unfunctionalized controls consistent with each subgroup based on raw polymer Mooney. Higher values are considered improvements.

TABLE 5

Compound testing results for the carbon black-filled formulation.

| Polymer | Functional Monomer | Raw Polymer Mooney Viscosity | G' (kPa) | G' 1%/G' 14% | Tangent Delta 10% | Zwick Rebound 100° C. | Insoluble Polymer (%) |
|---|---|---|---|---|---|---|---|
| E | control | 34 | 100 | 100 | 100 | 100 | 100 |
| A | 4-vinylbenzyl chloride | 39 | 97 | 114 | 116 | 113 | 114 |
| F | control | 59 | 100 | 100 | 100 | 100 | 100 |
| B | 4-vinylbenzyl chloride | 64 | 126 | 106 | 117 | 109 | 106 |
| C | 4-vinylbenzyl bromide | 53 | 113 | 99 | 96 | 99 | 110 |
| D | 4-vinylbenzyl thiocyanate | 65 | 112 | 99 | 111 | 109 | 105 |

TABLE 6

Compound testing results for the silica-filled formulation.

| Polymer | Functional Monomer | Raw Polymer Mooney Viscosity | G' (kPa) | G' 1%/G' 14% | Tangent Delta 10% | Zwick Rebound 100° C. | Insoluble Polymer (%) |
|---|---|---|---|---|---|---|---|
| E | control | 34 | 100 | 100 | 100 | 100 | 100 |
| A | 4-vinylbenzyl chloride | 39 | 148 | 131 | 137 | 112 | 121 |
| F | control | 59 | 100 | 100 | 100 | 100 | 100 |
| B | 4-vinylbenzyl chloride | 64 | 149 | 109 | 112 | 102 | 117 |
| C | 4-vinylbenzyl bromide | 53 | 141 | 107 | 99 | 97 | 120 |
| D | 4-vinylbenzyl thiocyanate | 65 | 116 | 110 | 110 | 100 | 108 |

From the results given in Table 5 and 6 it can be seen that the polymers prepared to illustrate the invention provide increased polymer-filler interaction as determined by dynamic measurements.

The halogenated functionalized monomers (Polymers A, B, and C) appear to provide improvements over the controls of similar unfilled Mooney viscosities (Polymers E and F) in the carbon black formulation. Uncured G' values are higher to equal (A compared to E and B, C compared to F) while the cured properties indicate equivalent to slightly improved hysteresis. Notably, rebound and bound rubber values are significantly higher.

For the silica-filled formulation, the halogenated samples clearly demonstrate improved interaction with the filler. Uncured G' and Mooney viscosity values are much higher than the controls (A compared to E and B, C compared to F), while, using the same comparisons, the cured properties indicate lower hysteresis. The Payne Effect is reduced for the halogenated polymers, and tan delta values are also significantly lower. Rebound values are equivalent to improved, but insoluble rubber is significantly higher for the functionalized polymers. The improvements appear to be maximized using the 4-vinylbenzyl chloride as the functionalized monomer.

The results using the 4-vinylbenzyl thiocyanate monomer (Polymer D) differ from the above examples in that there is a marked improvement over the control of similar raw polymer Mooney viscosity (Polymer F) in both carbon black and silica filled formulations.

While certain representative embodiments and details have been shown for the purpose of illustrating the subject invention, it will be apparent to those skilled in this art that various changes and modifications can be made therein without departing from the scope of the subject invention.

What is claimed is:

1. A rubbery polymer which consists of repeat units that are derived from (1) at least one conjugated diolefin monomer, (2) from about 0.1 weight percent to 2 weight percent of at least one monomer having the structural formula:

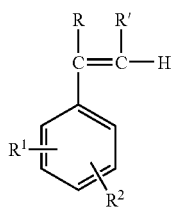

wherein R represents an alkyl group containing from 1 to about 10 carbon atoms or a hydrogen atom, wherein R' represents a methyl group or a hydrogen atom, with the proviso that if R represents an alkyl group then R' represents a hydrogen atom, wherein $R^1$ and $R^2$ can be the same or different, wherein R' represents an alkyl group that is functionalized with a leaving group, wherein $R^2$ represents a moiety selected from the group consisting of hydrogen atoms, alkyl groups containing from 1 to 18 carbon atoms, aryl groups containing from 6 to 18 carbon atoms, alkaryl groups containing from 7 to 18 carbon atoms, and alkyl groups that are functionalized with a leaving group, and (3) optionally, a vinyl aromatic monomer.

2. A rubbery polymer as specified in claim 1 wherein the leaving group is selected from the group consisting of chlorine groups, bromine groups, iodine groups and thiocyanate groups.

3. A rubbery composition which is comprised of (1) a filler and (2) a rubbery polymer as specified in claim 1.

4. A rubbery composition as specified in claim 3 wherein the filler is selected from the group consisting of carbon black, silica, starch, and clay.

5. A rubbery composition as specified in claim 4 wherein said rubbery composition is cured.

6. A rubbery composition as specified in claim 5 wherein said rubbery composition is cured with sulfur.

7. A rubbery polymer as specified in claim 1 wherein the leaving group-bearing monomer is of the structural formula:

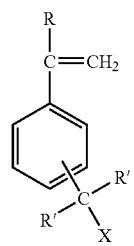

wherein R represents the a hydrogen atom or an alkyl group containing from 1 to 10 carbon atoms, wherein the R' groups can be the same or different and are selected from hydrogen atoms and alkyl groups containing from 1 to 4 carbon atoms, and wherein X represents a leaving group.

8. A rubbery polymer as specified in claim 7 wherein R represents a hydrogen atom, wherein the R' groups can be the same or different and are selected from hydrogen atoms and methyl groups, and wherein X represents a member selected from the group consisting of chlorine groups, bromine groups, iodine groups and thiocyanate groups.

9. A rubbery polymer as specified in claim 8 wherein the R' groups represent hydrogen atoms, and wherein X represents chlorine.

10. A rubbery polymer as specified in claim 1 wherein the leaving group-bearing monomer is of the structural formula:

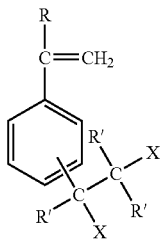

wherein R. represents a hydrogen atom or an alkyl group containing from 1 to 10 carbon atoms, wherein the R' groups can be the same or different and are selected from hydrogen atoms and alkyl groups containing from 1 to 4 carbon atoms, and wherein X represents a leaving group.

11. A rubbery polymer as specified in claim 10 wherein R represents a hydrogen atom, wherein the R' groups can be the same or different and are selected from hydrogen atoms and methyl groups, and wherein X represents a member selected from the group consisting of chlorine groups, bromine groups, iodine groups and thiocyanate groups.

12. A rubbery polymer as specified in claim 11 wherein the R' groups represent hydrogen atoms, and wherein X represents chlorine.

13. A rubbery polymer as specified in claim 1 wherein from about 0.2 weight percent to 1.5 weight percent of the repeat units in the rubbery polymer are derived from the leaving group-bearing monomer.

14. A rubbery polymer as specified in claim 1 wherein said rubbery polymer is oil extended.

15. A rubbery polymer as specified in claim 1 wherein from about 0.5 weight percent to 1 weight percent of the repeat units in the rubbery polymer are derived from the leaving group-bearing monomer.

16. A rubbery polymer as specified in claim 1 wherein in the rubbery polymer repeat units that are derived from the vinyl aromatic monomer are present.

17. A rubbery polymer as specified in claim 16 wherein the vinyl aromatic monomer is styrene.

18. A tire which is comprised of a generally toroidal-shaped carcass with an outer circumferential tread, two spaced beads, at least one ply extending from bead to bead and sidewalls extending radially from and connecting said tread to said beads, wherein said tread is adapted to be ground-contacting, and wherein said tread is comprised of (I) a filler, and (II) rubbery polymer which consists of repeat units That are derived from (1) at least one conjugated diolefin monomer, (2) from about 0.1 weight percent to 2 weight percent of at least one monomer having the structural formula:

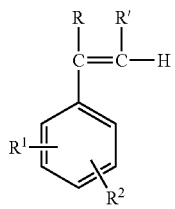

wherein R represents an alkyl group containing from 1 to about 10 carbon atoms or a hydrogen atom, wherein R' represents a methyl group or a hydrogen atom, with the proviso that if R represents an alkyl group then R' represents a hydrogen atom, wherein $R^1$ and $R^2$ can be the same or different, wherein $R^1$ represents an alkyl group that is functionalized with a leaving group, wherein $R^2$ represents a moiety selected from the group consisting of hydrogen atoms, alkyl groups containing from 1 to 18 carbon atoms, aryl groups containing from 6 to 18 carbon atoms, alkaryl groups containing from 7 to 18 carbon atoms, and alkyl groups that are functionalized with a leaving group, and (3) optionally, a vinyl aromatic monomer.

19. A tire as specified in claim 18 wherein the filler is silica.

20. A tire as specified in claim 19 wherein wherein the leaving group-bearing monomer is of the structural formula:

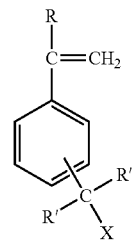

wherein R represents the a hydrogen atom or a methyl group, wherein the R' groups can be the same or different and are selected from hydrogen atoms and methyl grpups, and wherein X represents a member selected from the group consisting of chlorine atoms, bromine atoms, iodine atoms and thiocyanate groups.

21. A tire as specified in claim 20 wherein the leaving group-bearing monomer is present in the rubbery polymer at a level which is within the range of 0.5 weight percent to 1.5 weight percent.

\* \* \* \* \*